United States Patent Office 3,645,908
Patented Feb. 29, 1972

3,645,908
KETONE PEROXIDE COMPOSITION STABILIZED WITH AN AMINE
Wolfgang Edl, Grosshesselohe, Gebhard Faber, Hohenschaftlarn, Michael Koehler, Munich, Heinz Winter, Pullach, and Heinz Meyer, Munich, Germany, assignors to Elektrochemische Werke Munchen Aktiengesellschaft, Hollriegelskreuth, near Munich, Germany
No Drawing. Filed Sept. 25, 1967, Ser. No. 670,444
Claims priority, application Germany, Sept. 23, 1966, E 32,532; May 31, 1967, E 34,095
Int. Cl. C07c 73/00; C08f 1/60
U.S. Cl. 252—186        8 Claims

ABSTRACT OF THE DISCLOSURE

A cross-linking composition which is particularly suitable for the cross-linking of unsaturated polyester resins, contains at least one ketone peroxide, a solvent therefor, and at least one amine compound.

---

This invention relates to peroxygen compounds and especially to ketone peroxide containing compositions.

A major commercial use of ketone peroxides is in the cross-linking of resins and particularly unsaturated polyester resins either alone or, more commonly, in conjunction with a metal containing catalyst such as cobalt naphthenate, and possibly, organic co-accelerators. The ketone peroxide is usually used in solution in an inert solvent.

The use of such solutions of ketone peroxides in cross-linking is subject to the disadvantage that a marked reduction in catalytic activity in cross-linking often occurs on storage particularly at ambient temperatures. Such reduction in activity may sometimes be accompanied by a reduction in the active oxygen content of the peroxide present but is thought to be due, in the main, to changes in the balance of peroxidic species present in the solution.

The present invention provides a composition comprising one or more ketone peroxides, one or more inert solvents therefor, and stabilising quantity of one or more amine compounds, said amine compounds wholly consisting of one or more aliphatic or heterocyclic amines.

By a "stabilising quantity of amine" we mean a quantity which results, in practice, in an acceptable degree of stability of the ketone peroxide solution. Whether a proposed quantity of amine is a stabilising quantity or not may be determined by a simple storage test of the amine-treated ketone peroxide solution and of a similar, but untreated solution followed by a cross-linking trial of the same quantity of each solution on an unsaturated polyester resin. 14 days is a suitable period of time for such a storage test. Solutions according to the invention will show a markedly superior cross-linking behaviour.

Each amine/peroxide combination according to the invention shows a different degree of improvement in comparison with the untreated peroxide solution and so in some instances a greater quantity of amine may be necessary to achieve a desired effect. Again many amines, when present in excessive quantity in a ketone peroxide solution, for example in 10% to 15% by weight of the composition, cause instability but the concentration threshold where the stability effect of each amine, on each peroxide solution, starts to diminish is different in each instance. It is necessary therefore to determine by test in each instance whether a stabilising quantity of amine is present in a ketone peroxide solution.

By "inert solvent" we mean any solvent which is chemically inert to the ketone peroxide and in which the amine is also soluble. Suitable solvents may be divided generally into two classes namely into hydrophobic solvents and hydrophilic solvents and, indeed, a mixture of these two classes may also be used.

Amongst the hydrophilic solvents which are advantageously used are glycols, for example one or more of mono-, di-, tri-, or tetra ethylene glycol, propylene glycol, dipropylene glycol, pentylene glycol or hexylene glycol, glycol ethers, such as ethylene glycol monoethyl ether and its methyl and butyl derivatives ("Cellosolve," methyl "Cellosolve" and butyl "Cellosolve"), phosphate esters, such as trialkyl phosphates for example triethyl phosphate, and low molecular weight aliphatic alcohols. Suitable hydrophobic solvents are the phthalate esters such as dimethyl phthalate or di-butyl phthalate.

Ketone peroxides which are particularly advantageously employed in this invention are, for example, acetone peroxide, methyl ethyl ketone peroxide, methyl isobutyl ketone peroxide, methyl isoamyl ketone peroxide, ethyl amyl ketone peroxide, di-isobutyl ketone peroxide, cyclohexanone peroxides, an alkyl cyclohexanone peroxide such as methyl or ethyl cyclohexanone peroxide, acetophenone peroxide, diacetyl ketone peroxide, acetyl acetone peroxide, diacetone alcohol peroxide or 2-methyl 3-hydroxyl but-2-one peroxide, or other ketone peroxides related in structure to any of these. Methyl ethyl ketone peroxide, methyl isobutyl ketone peroxide, cyclohexanone peroxide and diacetone alcohol peroxide are preferred.

These ketone peroxides may have been prepared in a single stage reaction in a suitable solvent. For example a reaction mixture comprising the corresponding ketone, hydrogen peroxide, for example in from 60% to 100% w./w. concentration, and a catalyst, for example, a suitable source of hydrogen ion, may be suspended in a suitable inert solvent, for example a low molecular weight trialkyl phosphate, or a phthalate ester, or a glycol, and allowed to react at for example, temperatures of from 0° C. to 60° C. Alternatively a concentrated ketone peroxide solution may be diluted with a suitable inert solvent to the concentration required for a particular end use, either before or after the introduction of amines according to this invention. Ketone peroxides may advantageously be diluted to, or manufactured at, a concentration of as low as 10% w./w. to 50% w./w. for use as a catalyst for certain cross-linking reactions. Ketone peroxides diluted with, for example suitable esters or ketones are commonly used to cure unsaturated polyester varnishes. Solid forms of organic peroxides may also be incorporated into the compositions of this invention for instance by treating peroxide in powder or paste form with a solution of a suitable amine in a suitable solvent and then dissolving the treated peroxide in a suitable inert solvent.

The amines which are advantageously used in this invention are monoamines such as diethylamine, tributylamine or cyclohexylamine, di- or polyamines such as diethylene triamine or dipropylene triamine, amine alcohols such as mono-, di-, or tri-ethanolamine or di- or tri-isopropanolamine, and, amongst heterocyclic amines, those six membered ring compounds having one or more nitrogen atoms in the ring such as pyridine, piperidine, a picoline, a lutidine, or a collidine, or those five membered ring compounds having one or more nitrogen atoms in the ring such as an imidazole for instance benzimidazole, or a triazole for instance benzotriazole. Aromatic amines are not suitable for use in this invention particularly since they tend to produce discolouration of polymerisates catalysed by ketone peroxide solutions containing them and thus are most disadvantageous in, for instance, varnishes. The amines may be present, as we have said, in any stabilising quantity but advantageously are present in at least 5.0 meq./l. of the composition. A suitable quantity of amine is at least 0.005% by weight of the composition. While, in the case of many amines up to 5.0% by weight of the composition may be used without reaching the instability threshold referred to above it is particularly preferred to use lesser quantities for example not more than 100 meq./l. of the composition and, particularly, not more than 50 meq. or even 40 meq./l. of the composition.

In particularly advantageous embodiments of this invention the ketone peroxide solution containing a stabilising quantity of amine is further treated with a known cross-linking co-accelerator. Co-accelerators based on a β-diketo structure are very suitable. Examples of such co-accelerators are acetyl acetone and ethyl acetoacetates.

Ketone peroxide solutions to which such co-accelerators have been added are very unstable with respect to activity. After only short periods of storage gel times become extremely long. However when the ketone peroxide solution was an amine-containing composition according to this invention it was found that there was little decrease in activity on storage and that, in use in cross-linking, the composition possessed the expected advantages accruing from the presence of co-accelerators, namely, an improvement in the relationship between time to exotherm maximum and gel time. Particularly effective compositions are amine containing solutions in inert solvents of methyl ethyl ketone peroxide, diacetone alcohol peroxide, methyl isobutyl ketone peroxide or cyclohexanone peroxide also containing acetyl acetone or actoacetic ester co-accelerators. Preferably the amine stabiliser is tri-isopropanol-amine. Advantageously the co-accelerator is present in from 0.1 to 10% by weight preferably from 0.5 to 10% by weight of the composition.

The compositions provided by this invention, besides their activity constancy tend to have improved properties in respect of flammability and readiness to explode when subjected to shock or friction. If desired the compositions can also contain other known peroxide stabilisers, for example 2,6 dipicolinic acid or ethylene diamine tetra-acetic acid. Other additives such as wetting agents can also be added if desired.

The present invention also provides processes for cross-linking unsaturated polyester resins using ketone peroxide containing compositions herein and also for polymerised resin masses produced by such a process.

The invention will now be particularly illustrated by the following examples. Examples No. 2, 4, 5, 7, 9, 10, 12, 14, 16, 17, 19–24, 26, 27, 29, 31, 33, 35, 37, 39, 40–48 are according to the invention, the remaining examples being inserted for comparative purposes only.

EXAMPLES 1 AND 2

440 g. of triethyl phosphate were placed in a 2.1 four necked flask, with ground glass joints, which was fitted with a stirrer, an inner thermometer, a dropping funnel and a reflux condenser, and which was heated or cooled by means of a water bath. 150 g. of 85% hydrogen peroxide and then .5 g. of 20% sulphuric acid were added, slowly while stirring and cooling. Cooling was then stopped and 410 g. of cyclohexanone were added in drops so that the inner temperature could not rise above 50%. When all the cyclohexanone had been added, the temperature was maintained at 50° C. for a further 5 hours by heating the water bath. The mixture was then cooled to room temperature, stirring was continued, and a sample of the peroxide solution was stabilised with 20 m.e./l. of tri-isopropanol-amine. Both samples were stored at room temperature and the activity of the peroxide solution measured in the following way:

50 g. of a highly reactive commercial unsaturated polyester resin was treated, at 20° C. with 1% of a cobalt octoate solution in styrene (with 1% Co content) and 2% of the peroxide solution. The time in minutes taken for gelling to start ($t_{gel}$) and the time in minutes taken to reach the maximum temperature ($t_{max}$) were observed.

The following values were obtained.

| Example | Sample | Storage time of— | | | | | | | |
|---|---|---|---|---|---|---|---|---|---|
| | | 1 day | | 14 days | | 3 months | | 6 months | |
| | | $t_{gel}$ | $t_{max}$ | $t_{gel}$ | $t_{max}$ | $t_{gel}$ | $t_{max}$ | $t_{gel}$ | $t_{max}$ |
| 1 | Without amine | 20′ | 34′ | 30′ | 47′ | 58′ | | >200′ | |
| 2 | With tri-isopropanolamine | 16′ | 28′ | 22′ | 34′ | 18′ | 32′ | 20′ | 32′ |

EXAMPLES 3 AND 4

270 g. of triethyl phosphate and 270 g. of dimethylglycol phthalate were placed in a four necked flask, such as that described in Example 1, and 260 g. of 85% hydrogen peroxide was added while cooling and stirring. When the addition was completed, 0.5 g. of concentrated nitric acid (density 1.4) was added and 250 g. of methyl ethyl ketone was then added in drops at an internal temperature of 25° C. The mixture was then heated to 40° C., stirred at this temperature for a further two hours, cooled to room temperature and the sample divided into two parts.

Sample I, without amine
Sample II, 20 m.e./l. of triisopropanolamine and 300 p.p.m. of 2,6-dipicolinic acid added.

The activity and the active oxygen content were measured immediately after the preparation and after 14 days warm storage.

| | | Activity | | | | Available oxygen content, percent | |
|---|---|---|---|---|---|---|---|
| | | Initial | | After 14 days/ 50° | | Initial | After 14 days' warm storage |
| Example | Sample | $t_{gel}$ | $t_{max}$ | $t_{gel}$ | $t_{max}$ | | |
| 3 | I | 8′ | 14′30″ | 41′ | | 10.5 | 7.8 |
| 4 | II | 8′15ₛ | 15′ | 8′30″ | 15′20″ | 10.5 | 10.5 |

EXAMPLE 5

490 g. of triethyl phosphate was placed in a four necked flask, such as that described in Example 1, and 120 g. of 85% hydrogen peroxide was added while cooling and stirring. Cooling was then stopped and 390 g. of ethyl amyl ketone was added in drops, whereby the temperature rose to 50° C. After the addition of the ketone was completed, the mixture was stirred for a further hour at 50° C. and then cooled to room temperature.

15 m.e./l. of tri-isopropanolamine and 100 p.p.m. of dipicolinic acid were then added to the solution.

The activity of the solution was measured before and after storing for 14 days at 50°.

Activity (mins.)

Initial:
$t_{gel}$ ------------------------------------ 4′
$t_{max}$ ---------------------------------- 9′30″

After 14 days:
$t_{gel}$ ------------------------------------ 5′30″
$t_{max}$ ---------------------------------- 11′

EXAMPLES 6 AND 7

470 g. of trimethyl phosphate was placed in a 4 necked flask, such as that described in Example 1, and 180 g. of 95% hydrogen peroxide and 0.6 g. of concentrated hydrochloric acid (density 1.19) were added while cooling. Cooling was stopped when the addition was completed and 350 g. of cyclohexanone was added in drops, whereby the temperature was kept at 50° C. by regulating the addition in drops, whereby the temperature was kept at 50° C. by regulating the addition of the ketone. After completion of the cyclohexanone addition, the mixture was stirred for a further 3 hours at 50° C., then cooled to room temperature and the peroxide solution divided into two samples:

Sample I, without amine
Sample II, 25 m.e./l. of di-isopropanolamine and 200 p.p.m. of 2,6-dipicolinic acid added.

The activity and the active oxygen (AO) content were measured immediately after the preparation and after 14 days warm storage at 50° C.

50° C. It was then cooled to room temperature and the peroxide solution was divided into two samples:

Sample I, without amine
Sample II, 25 m.e./l. of triethylamine and 100 p.p.m. of 2,6-dipicolinic acid added.

The activity and the active oxygen content were measured immediately after the preparation and after 3 and 6 months storage at room temperature.

| | | Storage time of— | | | | | | | | |
|---|---|---|---|---|---|---|---|---|---|---|
| | | 1 day | | | 3 months | | | 6 months | | |
| Example | Sample | $t_{gel}$ | $t_{max.}$ | Percent AO | $t_{gel}$ | $t_{max.}$ | Percent AO | $t_{gel}$ | $t_{max.}$ | Percent AO |
| 11 | I | 12' | 20'30" | 5.8 | 20' | 35' | 4.2 | 30' | 54' | 3.8 |
| 12 | II | 13' | 22' | 5.8 | 14' | 24' | 5.7 | 14'30" | 26' | 5.5 |

| | | Activity | | | | Percent AO content | |
|---|---|---|---|---|---|---|---|
| | | Initial | | after 14 days | | | After 14 days warm storage |
| Example | Sample | $t_{gel}$ | $t_{max.}$ | $t_{gel}$ | $t_{max.}$ | Initial | |
| 6 | I | 10' | 17' | 13' | 22' | 8.0 | 6.4 |
| 7 | II | 10'30" | 18' | 11' | 19' | 8.0 | 7.6 |

In addition the explosion hazards of the peroxide solution were tested on Sample II by the steel bomb test described in the Journal "Arbeitsshutz" No. 9, pages 204–205 (1959) and No. 3, pages 53–58 (1961). The limiting diameter was <1 mm. The product was therefore shown to be incapable of exploding.

The flash point according to Marcusson (in an open crucible) was also determined. It was 120° C.

EXAMPLES 8–10

400 g. of triethyl phosphate was placed in a four necked flask, such as that described in Example 1, and 180 g. of 70% hydrogen peroxide was added while cooling and stirring. Cooling was then stopped and a mixture of 320 g. of cyclohexanone and 100 g. of commercial methyl cyclohexanone (mixture of the three isomers) was added in drops, whereby the temperature rose to 50° C. After the ketone addition was completed, the mixture was stirred for a further hour at 50° C. then cooled to room temperature and the peroxide solution divided into three parts:

Sample I, without amine
Sample II, 15 m.e./l. of triethylamine added
Sample III, 15 m.e./l. of triethylamine and 800 p.p.m. of 2,6-dipicolinic acid added.

The activity and available oxygen (AO) content were followed for a storage period of 6 months at room temperature; the results are shown in the table below:

In addition, the resistance to cold was determined on Sample II; that is: the resistance of the solutions to crystallisation at low temperatures. After the preparation 30 g. of Sample II was cooled in 5° C. steps and tested for crystallisation after standing for at least one day. This first occurred at a temperature of −5° C. The resistance to cold of Sample II is, therefore, about 0° C.

EXAMPLES 13 AND 14

400 g. of tri-isopropyl phosphate was placed in a two litre beaker which was fitted with a stirrer and an inner thermometer and which could be heated or cooled by means of a water bath. 160 g. of 85% hydrogen peroxide and 0.5 ml. of concentrated nitric acid (density 1.4) were added while cooling. Cooling was stopped when the addition was completed, and a mixture of 270 g. of cyclohexanone and 160 g. of commercial trimethylcyclohexanone was added in drops, the temperature being maintained at 50° C. by regulation of the ketone addition. After the addition was completed, the mixture was stirred for a further 5 hours at 50° C. then cooled to room temperature and the peroxide solution divided into two samples:

Sample I, without amine
Sample II, 40 m.e./l. of tri-isopropanolamine and 200 p.p.m. of 2,6-dipicolinic acid added.

The activity and the active oxygen content were measured immediately after the preparation and after 14 days warm storage at 50° C.

| | | Activity | | | | Percent AO content | |
|---|---|---|---|---|---|---|---|
| | | Initial | | After 14 days | | | After 14 days' warm storage |
| Example | Sample | $t_{gel}$ | $t_{max.}$ | $t_{gel}$ | $t_{max.}$ | Initial | |
| 13 | I | 18' | 30' | 35' | 56' | 6.6 | 4.9 |
| 14 | II | 20' | 33' | 23' | 36' | 6.6 | 6.4 |

| | | Storage time of— | | | | | | | | | | | |
|---|---|---|---|---|---|---|---|---|---|---|---|---|---|
| | | 1 day | | | 14 days | | | 3 months | | | 6 months | | |
| Ex. | Sample | $t_{gel}$ | $t_{max.}$ | Percent AO | $t_{gel}$ | $t_{max.}$ | | $t_{gel}$ | $t_{max.}$ | Percent AO | $t_{gel}$ | $t_{max.}$ | Percent AO |
| 8 | I | 5' | 11' | 6.2 | 6' | 13' | | 22' | 38' | 2.6 | 75' | | 1.3 |
| 9 | II | 5'30" | 11'30" | 6.2 | 5' | 11'30" | | 9' | 17' | 4.6 | 10'30" | 23' | 3.6 |
| 10 | III | 5'30" | 11'30" | 6.2 | 5'30" | 11'30" | | 6'30" | 13'30" | 5.8 | 7' | 14' | 5.6 |

EXAMPLE 11 AND 12

440 g. of triethyl phosphate was placed in a four necked flask such as that described in Example 1 and 150 g. of 85% hydrogen peroxide and 0.5 ml. of concentrated nitric acid (density 1.4) were added while cooling. When the addition was completed, cooling was stopped and 410 g. of cyclohexanone was added in drops. The temperature was maintained at 50° C., by regulating the addition of the ketone. After the cyclohexanone addition was completed, the mixture was stirred for a further 5 hours at

EXAMPLES 15–17

680 g. of triethyl phosphate was placed in a four necked flask, such as that described in Example 1, and 120 g. of 70% hydrogen peroxide was added while stirring and cooling. 250 g. of acetylacetone was then added in drops at a temperature of 25° C. After the addition of the ketone was completed, the mixture was cooled, while stirring, to room temperature and the peroxide solution divided into 3 parts.

Sample I, without amine.
Sample II, 15 m.e./l. of collidine (2,4,6-trimethylpyridine) added while stirring and cooling.
Sample III, 25 m.e./l. of triethylamine and 1000 p.p.m. of ethylenediaminotetra-acetic acid added.

The activity and the active oxygen content were measured immediately after the preparation and after 14 days warm storage at 50° C.

| Example | Sample | Activity | | | | Percent AO content | |
|---|---|---|---|---|---|---|---|
| | | Initial | | After 14 days/50° | | Initial | After 14 days' warm storage |
| | | $t_{gel}$ | $t_{max}$ | $t_{gel}$ | $t_{max}$ | | |
| 15 | I | 5' | 7' | 11' | 19' | 4.0 | 2.8 |
| 16 | II | 5'50'' | 8'40'' | 4'50'' | 8' | 4.0 | 3.7 |
| 17 | III | 6'50'' | 10'30'' | 6'15'' | 10' | 4.0 | 3.6 |

EXAMPLES 18–24

410 g. of triethyl phosphate was placed in a two litre beaker, such as that described in Example 13 and 160 g. of 85% hydrogen peroxide and 0.5 ml. of concentrated nitric acid (density 1.4) were added while cooling. Cooling was stopped when the addition was completed, and a mixture of 290 g. of cyclohexanone and 140 g. of commercial methylcyclohexanone (mixture of three isomers) was added in drops, the temperature being maintained at 50° C. by regulating the addition of the ketone. After the addition was completed, the mixture was stirred for a further 4 hours at 50° C. then cooled to room temperature and the peroxide solution divided into 7 samples:

Sample I, without amine.
Sample II, 25 m.e./l. of collidine and 100 p.p.m. of 2,6-dipicolinic acid added.
Sample III, 25 m.e./l. of tri-isopropanolamine and 100 p.p.m. of 2,6-dipicolinic acid added.
Sample IV, 25 m.e./l. of diethylaminopropylamine and 100 p.p.m. of 2,6-dipicolinic acid added.
Sample V, 25 m.e./l. of triethylamine and 100 p.p.m. of 2,6-dipicolinic acid added.
Sample VI, 25 m.e./l. of triethylamine and 100 p.p.m. of ethylenediaminotetra-acetic acid added.
Sample VII, 25 m.e./l. of triethylamine and 50 p.p.m. of ethylenediaminotetra-acetic acid added.

The activity and the active oxygen content were measured immediately after the preparation and after 14 days warm storage at 50° C.

| Example | Sample | Activity | | | | Percent AO content | |
|---|---|---|---|---|---|---|---|
| | | Initial | | After 14 days | | Initial | After 14 days' warm storage |
| | | $t_{gel}$ | $t_{max}$ | $t_{gel}$ | $t_{max}$ | | |
| 18 | I | 14'30'' | 31'30'' | 27'30'' | 60'' | 6.5 | 4.0 |
| 19 | II | 15'30'' | 28'30'' | 14' | 24' | 6.5 | 6.1 |
| 20 | III | 18'30'' | 30'30'' | 16'30'' | 26' | 6.5 | 6.0 |
| 21 | IV | 15'30'' | 27'30'' | 14' | 26'30'' | 6.5 | 6.2 |
| 22 | V | 16' | 29' | 13'30'' | 28' | 6.5 | 6.0 |
| 23 | VI | 16' | 27'30'' | 16' | 28' | 6.5 | 6.1 |
| 24 | VII | 16' | 28' | 16' | 27'30'' | 6.5 | 6.2 |

EXAMPLES 25–27

20% solutions of commercial cyclohexanone peroxide (technical 1', hydroxy1' hydroperoxy dicyclohexyl peroxide) in ethyl acetate were prepared and the activity constancy of the solutions checked by storing at 50° C. for 100 hrs.
Solution I contained 10% water, II contained 0.8 g./kg. tri-isopropanolamine, and III contained 10% of a 4% aqueous tri-isopropanolamine solution. The activity was measured at 20° C. with 10% peroxide solution and 2% of cobalt and accelerator.

| Example | Solution | Before warm storage | | After warm storage, 100 hrs. | |
|---|---|---|---|---|---|
| | | $t_{gel}$ | $t_{max}$ | $t_{gel}$ | $t_{max}$ |
| 25 | I | 21' | 39' | 14' | 30' |
| 26 | II | 21' | 38' | 20' | 37' |
| 27 | III | 21' | 38' | 20' | 38' |

EXAMPLES 28 AND 29

A solution of 30 parts of technical 1 hydroxy, 1'-hydroperoxydicyclohexyl peroxide and 15 parts of technical 1,1'-bis-(hydroperoxy)dicyclohexyl peroxide in 55 parts of triethyl phosphate was stored at 50° C. for 300 hours and the activity measured before and after the warm storage on Palatal P6 with 2% peroxide solution and 1% cobalt accelerator solution containing 1% cobalt. Solution I was used without further additives; 2.5 g./l. of triethylamine was added to Solution II before the warm storage.

| Example | Solution | Before warm storage | | After warm storage | |
|---|---|---|---|---|---|
| | | $t_{gel}$ | $t_{max}$ | $t_{gel}$ | $t_{max}$ |
| 28 | I | 36' | 49' | 29' | 38' |
| 29 | II | 36' | 50' | 35' | 48' |

EXAMPLES 30 AND 31

60 parts of technical 3,5 dimethyl 3,5 dihydroxy 1,2 dioxolan were dissolved in 60 parts of triethyl phosphate and the solution divided into two parts.
Part I was used unchanged and 0.2% of 2,4,6 trimethyl pyridine was added to Part II.
Both solutions were stored at 50° C. for 300 hours and the activity measured before and after warm storage on Palatal P6 with 2% peroxide and 1% cobalt solution containing 1% cobalt.

| Example | Solution | Before warm storage | | After warm storage | |
|---|---|---|---|---|---|
| | | $t_{gel}$ | $t_{max}$ | $t_{gel}$ | $t_{max}$ |
| 30 | I | 5' | 8' | 17' | 23' |
| 31 | II | 5' | 8' | 5' | 8' |

EXAMPLES 32 AND 33

40 parts of a 50% cyclohexanone peroxide paste (from technical 1', hydroxy 1', hydroperoxy dicyclohexyl peroxide) were dissolved in 60 parts of ethyl acetate and the solution divided into 2 samples 0.7 g./l. of dipropylenetriamine was added to solution II and both solutions were stored for 100 hours at 50° C.
The activities of the solutions were tested with 10% of solution and 2% of cobalt solution containing 1% cobalt before and after the warm storage.

| Example | Solution | Before warm storage | | After warm storage | |
|---|---|---|---|---|---|
| | | $t_{gel}$ | $t_{max}$ | $t_{gel}$ | $t_{max}$ |
| 32 | I | 17' | 20' | 11'30'' | 22' |
| 33 | II | 16' | 28' | 17' | 29' |

EXAMPLES 34 AND 35

50 parts of a commercial methyl ethyl ketone peroxide solution in dimethyl phthalate with a 9% active oxygen content were mixed with 50 parts of acetone and 0.005 part of 2,6-pyridine dicarboxylic acid solution added. The solution obtained was divided and 2.5 g./l. of triisopropanolamine added to Solution II. Both solutions were stored at room temperature for 3 months and the activity was checked with 6% peroxide and 2% cobalt solution containing 1% cobalt as above, before and after storage.

| Example | Solution | Before warm storage | | After warm storage | |
|---|---|---|---|---|---|
| | | $t_{gel}$ | $t_{max.}$ | $t_{gel}$ | $t_{max.}$ |
| 34 | I | 6' | 16' | 12' | 37' |
| 35 | II | 6' | 15' | 7' | 18' |

EXAMPLES 36 AND 37

50 parts of a commercial solution of methyl isobutyl ketone peroxide in alkyl benzene with an active oxygen content of 11% were dissolved in 50 parts of cyclohexanone and the solution divided into two parts.

5 g./l. of triisopropanolamine was added to part II and both solutions were stored at room temperature for 3 months. The activity of the solutions was determined before and after storage with 6% peroxide and 2% cobalt solution containing 1% cobalt in the known manner.

a marked improvement in the relationship between time to exotherm maximum and gel time. However after only short periods of storage the gel times, when used to cross-link "Crystic 189" (trade name) resin in conjunction with a cobalt containing accelerator, lengthened. The freshly prepared composition gave a gel time of 16 minutes and a time to exotherm maximum of 25 minutes. After 4 days storage at room temperature a gel time of 56 minutes and a time to exotherm maximum of 77 minutes was obtained. When 1% tri-isopropanolamine and 5% acetyl acetone were used results shown in the accompanying table were obtained.

Gel times and exotherm data for the curing of Crystic 189 at 20° C. (1% addition of cobalt accelerator)

| | Storage at room temperature | | | | | | | | | Storage at 40° C. | | | | | | | | |
|---|---|---|---|---|---|---|---|---|---|---|---|---|---|---|---|---|---|---|
| | 1% DAAP (Ex. 40) | | | 2% DAAP (Ex. 41) | | | 3% DAAP (Ex. 42) | | | 1% DAAP (Ex. 43) | | | 2% DAAP (Ex. 44) | | | 3% DAAP (Ex. 45) | | |
| Duration of storage | tg | tc | Tm | tg | tc | Tm | tg | tc | Tm | tg | tc | Tm | tg | tc | Tm | tg | tc | Tm |
| Weeks: | | | | | | | | | | | | | | | | | | |
| 0 | 23 | 43 | 107 | 12 | 23 | 115 | 9 | 20 | 128 | 23 | 43 | 107 | 12 | 23 | 115 | 9 | 20 | 128 |
| 1 | 27 | 46 | 126 | 16 | 29 | 112 | 12 | 24 | 131 | 27 | 50 | 107 | 17 | 31 | 108 | 15 | 27 | 122 |
| 2 | 27 | 48 | 109 | 15 | 29 | 116 | 13 | 24 | 129 | 23 | 50 | 90 | 15 | 29 | 120 | 15 | 28 | 130 |
| 3 | 27 | 51 | 92 | 15 | 29 | 124 | 13 | 24 | 134 | | | | | | | | | |
| 5 | 28 | 50 | 97 | 16 | 32 | 118 | 14 | 25 | 136 | 24 | 65 | 66 | 16 | 36 | 104 | 19 | 34 | 108 |
| 6 | 27 | 50 | 111 | 14 | 29 | 118 | 13 | 25 | 124 | 30 | 84 | 64 | 20 | 43 | 100 | 20 | 38 | 105 |
| 7 | 26 | 45 | 98 | 17 | 30 | 115 | 15 | 25 | 128 | 57 | 108 | 50 | 28 | 58 | 96 | 30 | 49 | 124 |
| 8 | 26 | 43 | 129 | 16 | 29 | 129 | 14 | 25 | 129 | 88 | 210 | 36 | 42 | 85 | 70 | 44 | 71 | 113 |
| 9 | 25 | 42 | 114 | 15 | 28 | 113 | 13 | 25 | 130 | 157 | | | 52 | 142 | 44 | 59 | 119 | 68 |

NOTE.—DAAP=Diacetylalcohol peroxide; tg=gel time; tc=curing time; Tm=maximum temperature.

EXAMPLES 46–48

These examples illustrate the advantages of methyl ethyl ketone peroxide (MEKP) containing compositions when stabilised according to the present invention. The MEKP solution was dissolved in a mixture of dipropylene glycol and dimethyl phthalate.

| Mls. accelerator/ 100 g. of resin | | Ex. 46 5% acetyl acetone added. Storage at 40° C. Gel time (mins.) after— | | | Example 47 5% acetyl acetone plus 1% triisopropanolamine. Storage at 40° C. Gel time (mins.) after— | | | | Example 48 5% acetyl acetone plus 1% triisopropanolamine. Storage at room temp. Gel time (mins.) after— | | |
|---|---|---|---|---|---|---|---|---|---|---|---|
| MEKP | Cobalt accel. | 0 day | 3 days | 5 days | 0 wk. | 1 wk. | 2 wks. | 3 wks. | 0 wk. | 5 wks. | 9 wks |
| 1 | 1 | 69 | 82 | 103 | 63 | 62 | 61 | 66 | 63 | 68 | 56 |
| 2 | 1 | 21 | 29 | 35 | 27 | 26 | 28 | 29 | 27 | 30 | 27 |
| 3 | 1 | 12 | 17 | 22 | 20 | 18 | 19 | 20 | 20 | 21 | 17 |

| Example | Solution | Before warm storage | | After warm storage | |
|---|---|---|---|---|---|
| | | $t_{gel}$ | $t_{max.}$ | $t_{gel}$ | $t_{max.}$ |
| 36 | I | 30' | 45' | 11' | 21' |
| 37 | II | 29' | 43' | 24' | 39' |

EXAMPLES 38 AND 39

30 parts of technical 1', hydroxy 1(, hydroperoxy-dicyclohexyl peroxide and 20 parts of 3,5 dimethyl 3,5 dihydroxy dioxolan 1,2 were dissolved in 50 parts of triethyl phosphate and 0.01 part of 2,6 pyridine dicarboxylic acid added.

The solution obtained was divided and 2 g./l. of benzimidazol was added to part II.

Both solutions were stored for 300 hrs. at 50° C. and the activities were measured with 2% peroxide and 1% cobalt accelerator solution containing 1% cobalt before and after warm storage.

| Example | Solution | Before warm storage | | After warm storage | |
|---|---|---|---|---|---|
| | | $t_{gel}$ | $t_{max.}$ | $t_{gel}$ | $t_{max.}$ |
| 38 | I | 6' | 11' | 18' | 26' |
| 39 | II | 6' | 11' | 10' | 16' |

EXAMPLES 40–45

10% of acetyl acetone was added to a diacetone alcohol peroxide solution and the resulting composition showed The trade names "Palata P6" and "Crystic 189" designate commercially available reactive unsaturated polyester resins prepared from maleic anhydride, phthalic acid, and propylene glycol dissolved in styrene and conventionally stabilized.

We claim:

1. A composition suitable as cross-linking agent consisting of at least one ketone peroxide, at least one inert solvent therefor selected from the group consisting of glycols, glycol ethers, lower trialkyl phosphates, low molecular weight aliphatic alcohols and acetic acid esters thereof, lower alkyl phthalate esters and alkyl benzenes, and a stabilizing quantity of at least one amine compound selected from the group consisting of lower alkyl amines, alkanol amines, and five and six membered heterocyclic ring compounds containing at least one ring nitrogen.

2. A composition as claimed in claim 1 wherein at least one of said alkanol amines is a member of the group consisting of monoethanolamine, diethanolamine, triethanolamine, di-iso-propanolamine, and triiso-propanolamine.

3. A composition as claimed in claim 1 wherein said lower alkyl amine is a member of the group consisting of diethylamine, triethylamine, tributylamine, cyclohexylamine, diethylene triamine, dipropylene triamine and diethylamino-propylamine.

4. A composition as claimed in claim 1 wherein said heterocyclic ring compound is a member of the group consisting of pyridine, piperidine, a picoline, a lutidine, a collidine, an imidazole, and a triazole.

5. A composition as claimed in claim 1 wherein said ketone peroxide is a peroxide of a member of the group consisting of acetone, methyl ethyl ketone, methyl isobutyl ketone, methyl isoamyl ketone, ethyl amyl ketone, diisobutyl ketone, cyclohexanone, alkyl cyclohexanone, acetophenone, diacetyl ketone, acetyl acetone, and diacetone.

6. A composition as claimed in claim 1 wherein said amine compound is present in an amount of 0.005% to 5.0% by weight of the composition.

7. A composition as claimed in claim 1 containing, in addition, a compound selected from the group consisting of acetyl acetone and lower alkyl acetoacetates as co-accelerator.

8. A method for stabilizing a cross-linking agent containing at least one ketone peroxide and at least one inert solvent therefor selected from the group consisting of glycols, glycol ethers, lower trialkyl phosphates, low molecular weight aliphatic alcohols and acetic acid esters thereof, lower alkyl phthalate and alkyl benzenes, said method comprising adding to said cross-linking agent a stabilizing amount of at least one amine compound selected from the group consisting of lower alkyl amines, alkanol amines, and five and six membered heterocyclic ring compounds containing at least one ring nitrogen.

References Cited

UNITED STATES PATENTS 3,326,809  6/1967  Mageli _____ 252—188.3

FOREIGN PATENTS 1,032,122  6/1966  Great Britain.
1,378,934  10/1964  France.
1,319,091  1/1963  France.

LEON D. ROSDOL, Primary Examiner

I. GLUCK, Assistant Examiner

U.S. Cl. X.R.

252—99, 182; 260—502 R, 610 R, 610 A